United States Patent [19]

Kitchloo et al.

[11] Patent Number: 5,443,597
[45] Date of Patent: Aug. 22, 1995

[54] METHOD OF TINTING POLYCARBONATE-POLYESTER COPOLYMERS

[75] Inventors: Paresh V. Kitchloo, North Attleborough, Mass.; Robert A. Sallavanti, Dalton, Pa.

[73] Assignee: Gentex Optics, Inc., Carbondale, Pa.

[21] Appl. No.: 216,613

[22] Filed: Mar. 23, 1994

[51] Int. Cl.$^6$ .............................. D06P 5/20
[52] U.S. Cl. ........................... 8/444; 8/506; 8/115.53; 8/930; 351/177; 427/558
[58] Field of Search .............. 427/558, 164, 229; 8/444, 506, 507, 115.53, DIG. 12, 922, 930; 351/162, 177

[56] References Cited

U.S. PATENT DOCUMENTS

| | | | |
|---|---|---|---|
| 3,154,479 | 10/1964 | Muroi et al. | 8/444 |
| 4,057,657 | 11/1977 | Garnett et al. | 427/44 |
| 4,855,377 | 8/1989 | Yokota et al. | 528/25 |
| 5,013,608 | 5/1991 | Guest et al. | 427/164 |
| 5,275,854 | 1/1994 | Maier et al. | 428/36.5 |

FOREIGN PATENT DOCUMENTS 1284125 5/1991 Canada .
4-353529 12/1992 Japan .

*Primary Examiner*—Paul Lieberman
*Assistant Examiner*—Caroline Dusheck
*Attorney, Agent, or Firm*—Shenier & O'Connor

[57] ABSTRACT

A surface of an article, such as an optical element, formed of a polycarbonate-polyester copolymer, is subsequently tinted to a predetermined degree by first subjecting said surface to ultraviolet radiation of predetermined intensity for a predetermined period of time.

6 Claims, 1 Drawing Sheet

METHOD OF TINTING POLYCARBONATE-POLYESTER COPOLYMERS

BACKGROUND OF THE INVENTION

In the prior art, tinting of polycarbonate articles, such as optical elements, and more particularly lenses, is accomplished by applying a tintable coating to a surface. A further and more aggressive method involves applying to the surface dyes dissolved in solvents which also soften or partially dissolve the polycarbonate or subjecting the surface to dye solutions incorporating a solvent which softens the polycarbonate and allows the dye to enter. In the aggressive method, a lens exhibits optical distortion, haze and weakening due to surface stresses.

SUMMARY OF THE INVENTION

We have found that the surface of a polycarbonatepolyester copolymer can be tinted cosmetically and functionally without the use of tintable coatings and without the use of such aggressive measures as softening or partially dissolving the surface of the plastic by first subjecting the copolymer to ultraviolet radiation of predetermined intensity for a predetermined period of time. We believe this opens up pores on a lens surface allowing the dye to enter the plastic and remain there. The copolymer preferably has nearly the same advantageous physical, mechanical and chemical properties as the polycarbonate homopolymer.

DESCRIPTION OF THE DRAWINGS

In the accompanying drawings which form part of the instant specification and are to be read in conjunction therewith:

Referring now to FIG. 1, the polycarbonate moiety is a condensation polymer resulting typically from the reaction of bisphenol A derivatives with phosgene and in which R is alkyl or aryl and R' is alkyl or aryl. One copolymer which we have used is "LEXAN SP", a trademark of the General Electric Company of Fairfield, Connecticut for a resin manufactured by its Plastics Division of Pittsfield, Mass. This copolymer is approximately 90 mole percent polycarbonate and 10 mole percent polyester in random distribution, where n is the average number of repeating polycarbonate groups and m is the average number of repeating polyester groups. In principal, m could be equal to two, but is in general much greater. For this copolymer, the average value of n/m would be 9.0 approximately. In the polyester moiety, the value of e may range between eight and twelve. This molar 90%-10% polycarbonate-polyester copolymer has almost the same physical, mechanical and chemical properties as polycarbonate.

Referring now to FIG. 2 which shows a polyester moiety where m=3, we believe ultraviolet radiation primarily breaks one or more of the polyester bonds indicated generally by the numeral 7. However, one or more of the polyester bonds 6 may alternatively or additionally be broken. It is also possible that the polycarbonate-polyester bond 5 may be broken and that alternatively or additionally the polyesterpolycarbonate bond 8 may be broken. The copolymer chains are broken at more or less regular intervals; and in the region of a bond break, the copolymer chains tend to pull apart leaving a void or pore which can hold a dye molecule.

Referring now to FIG. 3, curve 10 shows the percent transmittance versus wavelength in the ultraviolet region, less than 400 nanometers, of a plano lens blank having a thickness of two millimeters formed of LEXAN SP resin which is not stabilized against UV. One side of the lens was subjected to ultraviolet radiation from an arc lamp rated at 200 watts per inch of arc at a distance of eight inches from the lamp for fifteen minutes. Curve 11 shows the reduced transmittance in the ultraviolet region. The other side of the lens was then subjected to ultraviolet radiation of the same source intensity, distance and time; and curve 12 shows the further reduced ultraviolet transmittance. We postulate that this results from a "photo-Fries rearrangement" wherein the breaking of surface bonds and the resulting reduction in length of the surface copolymer chains acts to partially block UV radiation.

EXAMPLE 1

A first MYLAR polyester film (a registered trademark of E. I. dupont de Nemours & Co.) of 5 mils thickness exhibited a photopic transmittance in the visual spectrum of 91.5%. One side of the first film was exposed to UV radiation from a 200 watts per inch arc lamp at a distance of six inches for fifteen minutes. The photopic transmittance was now 91%. The other side of the first film was exposed to UV radiation of the same source intensity, distance and time; and the photopic transmittance of the film was then 90.5%.

Figure 1:
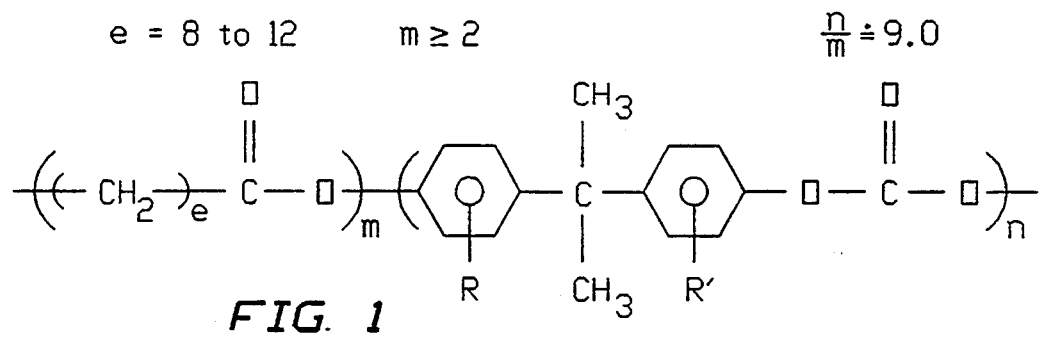
FIG. 1 shows the formula for a preferred polycarbonate-polyester copolymer.
Figure 2:
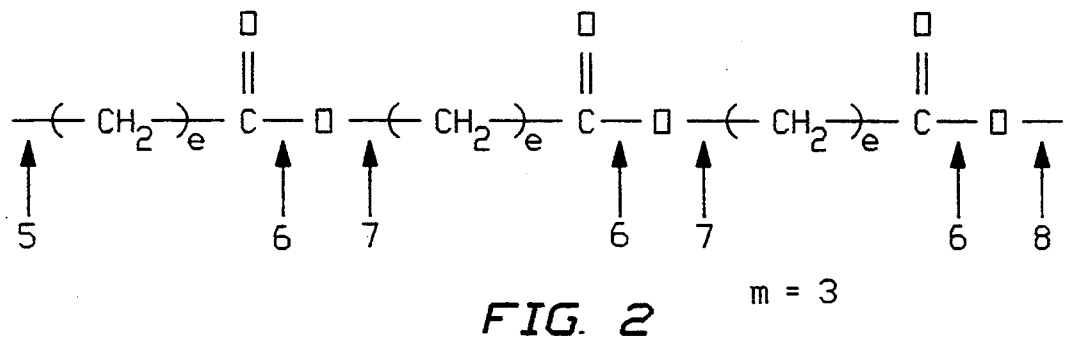
FIG. 2 shows the formula for a polyester moiety and indicates the locations of various bonds which may be broken by UV radiation to open surface pores.
Figure 3:
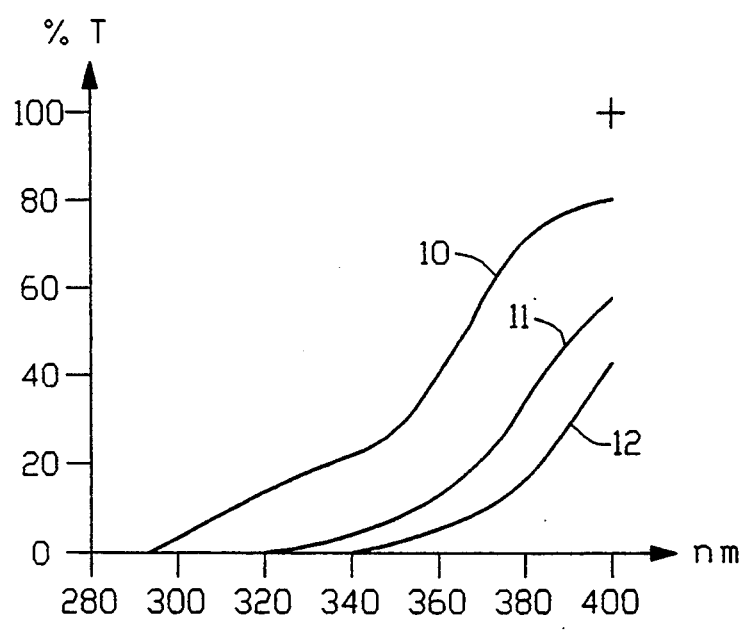
FIG. 3 shows graphs of percent transmittance versus wavelength.

While the breaking of surface polyester bonds in the polycarbonate-polyester copolymer by UV radiation causes a significant reduction in UV transmittance, as shown in FIG. 3, there is negligible reduction in photopic transmittance in the visible spectrum even for a polyester homopolymer having no polycarbonate moiety.

A second MYLAR polyester film of 5 mils thickness was immersed in an aqueous solution of "Black Dye", manufactured by Brainpower Inc. of Miami, Fla., 204 degrees F. for twelve minutes; and the photopic transmittance dropped to 70% from 91.5%.

The first film was then immersed in the Black Dye solution at 204 degrees F. for twelve minutes; and the photopic transmittance dropped to 44% from 90.5%.

In Example 1, the plastic film may be considered as the limiting case of a polycarbonate-polyester copolymer having nearly zero mole percent polycarbonate and nearly 100 mole percent polyester. The physical, mechanical and chemical properties of, for example, a polycarbonate-polyester copolymer having a mole percentage of 10% polycarbonate and 90% polyester would be generally the same as polyester.

In each of the following examples, the article is a plano lens blank of 2 mm thickness formed of LEXAN SP resin, unstabilized against UV, and exhibiting a photopic transmittance of 90%, the 10% loss being essentially due to surface reflections. For plano lenses and lenses of low positive and negative powers, the front surface remote from the eye is convex and the rear surface adjacent the eye is concave.

EXAMPLE 2

A first lens was not exposed to ultraviolet radiation. One surface of a second lens was exposed to ultraviolet radiation from an arc lamp rated at 200 watts per inch at a distance of six inches for five minutes; and one surface of a third lens was exposed to ultraviolet radiation of the same source intensity and distance for ten minutes. The three lenses were then immersed in an aqueous solution of Black Dye at 205 degrees F. for 45 minutes. The photopic transmittance of the first lens was 87%; that of the second lens was 57%; and that of the third lens was 48%. The Black Dye is a cosmetic dye. It will be noted that for the first lens, the dye caused a reduction in photopic transmittance of 3% from 90% to 87%, indicating a depth of tint of only 1.5% for each surface of the unirradiated lens.

EXAMPLE 3

Similar tests were repeated with Brown, Red, Yellow and Blue cosmetic dyes manufactured by Brainpower Inc. For each dye a first lens was not exposed to UV radiation; and one surface of a second lens was exposed for 150 seconds to an ultraviolet arc lamp rated at 200 watts per inch at a distance of six inches. Each of the four respective pairs of lenses were immersed in corresponding aqueous dye solutions at 190 degrees F. for 50 minutes. The percent photopic transmittances of the four pairs of lenses were:

| Dye Color | Lens 1 | Lens 2 |
|---|---|---|
| Brown | 26 | 1 |
| Red | 66 | 45 |
| Yellow | 83 | 75 |
| Blue | 85 | 64 |

Where only one surface of a lens is irradiated, as in Examples 2 and 3, it is preferable that it be the rear surface adjacent the eye.

Functional dyes would include ultraviolet absorbing dyes, photochromic dyes, infrared absorbing dyes and laser wavelength absorbing dyes.

EXAMPLE 4

In this example, the functional dye is an infrared absorber (and laser wavelength absorber) having a large molecule; and no dye was taken up by a lens not exposed to UV radiation. A solution was prepared comprising 100 ml of anhydrol PM 4082, an ethanol product manufactured by Union Carbide Corporation of Danbury, Connecticut, 2 ml of dimethylformamide and 38 grams of tris (P-diethylaminophenyl) aminium hexafluoroantimonate dye. The solution was used at its boiling point of approximately 140 degrees F. Preliminarily we found no change in the 90% transmittance of an unirradiated lens at 1064 nanometers wavelength before and after immersion in this solution for 30 seconds. This wavelength is provided by a neodymium YAG laser. Each side of three further lenses was exposed for five minutes to UV radiation from an arc lamp rated at 200 watts per inch at a distance of six inches. A first irradiated lens was immersed in the dye solution for 30 seconds, a second irradiated lens was immersed for six minutes, and the third irradiated lens was immersed for ten minutes. The transmittance of the irradiated lenses at 1064 nanometers wavelength was 1% for the first lens, 0.1% for the second lens, and 0.0003% for the third lens, corresponding to respective optical densities of 2.0, 3.0 and 5.5 at the 1064 nm wavelength of the neodymium YAG laser. Clearly the greatest depth of tint and the greatest optical density can be obtained by irradiating both lens surfaces before tinting.

The IR absorbing dyes including that of Example 4 are not absorbed by tintable coatings. The IR absorbing dyes also degrade so rapidly at molding temperatures that only plano or low power positive and negative lenses can be made by mixing the IR absorbing dye with molten polycarbonate or polycarbonate-polyester copolymer. Our invention makes possible the production of IR absorbing lenses in medium and high positive and negative powers.

We have found that while subjecting one surface of a copolymer lens to ultraviolet radiation greatly increases the depth of tint of that surface, yet there is appreciable increase in depth of tint of the opposite surface. FIG. 3 shows that the breaking of surface bonds on one surface by UV radiation causes a reduction in transmittance in the ultraviolet region and hence causes a reduction in the intensity of UV radiation from the arc lamp which is transmitted through the lens to the opposite surface. We have noted that a UV irradiated lens undergoes an almost imperceptible yellowing; but there is no loss in gross strength nor any detectable degradation in mechanical surface properties.

While we have tested only polyester homopolymers and polycarbonate-polyester copolymers having no stabilization against UV, it will be understood that the plastic may indeed be UV-stabilized as by incorporating a UV absorber, typically 0.1% by weight or less. However, the plastic should not be UV-stabilized to an excessive extent. If further UV absorption is required, then it may be provided by surface tinting with a UV absorbing dye.

We have found that the dyeing effect is confined to the surface and that thicker lenses dyed to the same extent as thinner lens under similar conditions. Furthermore, for each particular dye there appears to be a certain limited depth of tint which cannot be increased by increasing the intensity of UV radiation, increasing the time of exposure to UV radiation, increasing the concentration of the dye solution, changing the solvent, increasing the temperature of the dye solution, and increasing the time of immersion in the dye solution. An increase in intensity of UV irradiation of a lens is accomplished by reducing the distance between such lens and the arc lamp, which is typically operated at its rated intensity.

The size or mean diameter of a dye molecule may range from 20 angstroms for some ultraviolet absorbing dyes to 100 angstroms for infrared absorbing dyes and some photochromic dyes. The depth of dye penetration is believed to be 100 to 150 angstroms. The 5 mil films of Example 1 have a thickness of $1.26 \times 10^6$ angstroms, which is ten-thousand times the depth of dye penetration. The molecular weight of a dye should generally be less than 900.

If a greater depth of tint of an irradiated lens is required, then the copolymer should have a greater proportion of polyester. A molar 80%–20% polycarbonate-polyester copolymer should provide twice the optical density, for a given dye, of a 90%–10% LEXAN SP copolymer, but at the expense of reduced physical, mechanical and chemical properties. The copolymer should preferably have more than 75 mole percent polycarbonate and less than 25 mole percent polyester.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of tinting a surface of an article formed of a polycarbonate-polyester copolymer including the steps of subjecting said surface to ultraviolet radiation of pretermined intensity for a predetermined period of time sufficient to permit subsequent tinting of said surface to a predetermined agree and then tinting said surface, said intensity being sufficiently low that substantially no change occurs in the mechanical properties of the surface.

2. A method as in claim 1 wherein the copolymer is more than 75 mole percent polycarbonate and less than 25 mole percent polyester.

3. A method as in claim 1 wherein the article is a lens having front and rear surfaces.

4. A method as in claim 3 wherein the rear surface is subjected to said radiation and tinting.

5. A method of tinting an optical element formed of a polycarbonate-polyester copolymer and having two optical surfaces including the steps of subjecting said surfaces to ultraviolet radiation of predetermined intensities for predetermined periods of time sufficient to permit subsequent tinting of said surfaces to predetermined degrees and then tinting said surfaces, said intensities being sufficiently low that substantially no change occurs in the mechanical properties of the surfaces.

6. A method as in claim 5 wherein the copolymer is more than 75 mole percent polycarbonate and less than 25 mole percent polyester.

* * * * *

UNITED STATES PATENT AND TRADEMARK OFFICE
CERTIFICATE OF CORRECTION

PATENT NO. : 5,443,597
DATED : August 22, 1995
INVENTOR(S) : Paresh V. Kitchloo and Robert A. Sallavanti It is certified that error appears in the above-indentified patent and that said Letters Patent is hereby corrected as shown below:

Col. 5, Claim 1, line 4,
    change "pretermined" to --predetermined--.

line 6,
    change "agree" to --degree--.

Signed and Sealed this

Twenty-fourth Day of October, 1995

Attest:

BRUCE LEHMAN

*Attesting Officer*    *Commissioner of Patents and Trademarks*